United States Patent Office 3,651,109
Patented Mar. 21, 1972

3,651,109
PROCESS FOR PREPARING ORGANOMERCURY COMPOUNDS
Ronald D. Clark, North Randall, and Ronald J. Valus, Cleveland, Ohio, assignors to The Standard Oil Company, Cleveland, Ohio
No Drawing. Filed July 31, 1969, Ser. No. 846,598
Int. Cl. C07f 3/10
U.S. Cl. 260—431          7 Claims

ABSTRACT OF THE DISCLOSURE

Organomercury compounds can be prepared in essentially theoretical yields by reacting an organomercuric halide with magnesium metal in the presence of carbon dioxide.

---

This invention relates to a novel process for preparing organomercury compounds. More particularly, this invention relates to a process for preparing organomercury compounds having the formula

wherein R represents a hydrocarbon group. According to the present invention organomercury compounds of the above formula can be prepared by reaction of the corresponding organomercuric halide with magnesium in the presence of carbon dioxide.

The preparation of organomercury compounds by the method described herein is surprising in view of the published literature and certain reactions observed in the laboratory. For example, according to Dessy et al., Journal of American Chemical Society, volume 88, page 460 (1966), diphenyl magnesium is obtained by the reaction of diphenyl mercury and magnesium metal in ether; and Salinger and Dessy, Tetra Letters, pages 729–734 (1963), prepared dimethyl magnesium from dimethyl mercury and magnesium metal.

We have discovered that although the reaction of metal interchange of organomercuric halide compounds and magnesium will take place under a nitrogen atmosphere as anticipated, di-substituted organomercury is quantitatively recovered from the reaction mixture in the presence of carbon dioxide. For example, we found that the reaction of phenyl mercuric bromide with magnesium in a nitrogen atmosphere will proceed with complete exchange of mercury to form a species similar to a Grignard reagent, while a parallel reaction in a carbon dioxide atmosphere results in the formation of diphenyl mercury in quantitative yields.

Although the true mechanism for the reaction in this system is not known, it is postulated that the reaction is related to the chemisorption of carbon dioxide on the surface of the metal which prevents the metathesis of the organomercuric compound but still allows a reduction of organomercuric halide to take place.

In accordance with the present invention, the reaction that takes place in this process may be represented by the following general equation:

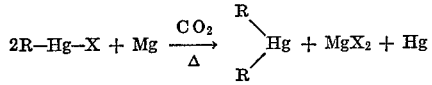

wherein R is a hydrocarbon group containing from about 1 to 30 carbon atoms, and more preferably R is an alkyl group, an aryl group containing from 6 to 30 carbon atoms or a cycloalkyl group containing from 3 to 30 carbon atoms, and X is a halogen selected from the group consisting of chlorine, bromine or iodine.

The reaction is advantageously carried out in the presence of an inert solvent, i.e., one which will not react with the reaction components or the reaction products. A polar, aprotic solvent is preferred, and for ease of product recovery it is more preferred that the solvent have a boiling point within the range of 50 to 80° C. and that it be miscible with water. Throughout the reaction it is preferred that the solvent as well as the entire reaction system be free from contamination with water since the presence of water inhibits the reaction. Examples of suitable inert solvents for use in this invention include diethyl ether, dimethyl formamide, dimethyl sulfoxide, hexamethyl phosphoramide and tetrahydrofuran. A preferred solvent is tetrahydrofuran.

The reaction is conducted at elevated temperatures in the range of from about 35° C. to about 100° C. and preferably at temperatures from about 55 to 75° C. If the reaction is carried out under reflux conditions the boiling point of the solvent can be utilized as a means for controlling the reaction temperature.

The relative proportions of the reactants employed in the process are not critical. Generally, for optimum yields it is preferred to employ stoichiometric amounts of the reacting materials, however, a fairly large excess of carbon dioxide or magnesium may be used without any apparent effect on the course of the reaction or on the yield. For example, a magnesium concentration as high as a tenfold excess over the stoichiometric requirement has been employed successfully. However, if very low concentrations of carbon dioxide or less than stoichiometric amounts of magnesium are employed the reaction does not go to completion, and a lower yield of product is obtained. A reaction time of several hours may be required for completion of the reaction. Again, the reaction time is not critical, but under the usual reaction conditions the reaction is generally completed in about three hours.

The reaction product may be recovered from the reaction mixture by any one of several different methods. A preferred method involves converting the unreacted magnesium in the product mixture to water-soluble magnesium chloride by pouring the reaction mixture into a solution of ice and hydrochloric acid. If the reaction product is a solid, the product may be separated from the aqueous mixture along with unreacted mercury metal by filtration. The product is then recovered from the mercury metal by washing the residue with a suitable solvent such as, for example, benzene, and subsequently separating the product from the solvent by fractional crystallization. If the reaction product is a liquid the product can be recovered from the water solution by solvent extraction.

The mercury compounds of this invention are useful in various applications such as germicides, fungicides and bactericides for vegetable and animal matter (British Pat. No. 901,562). Dipenyl mercury in particular has been found to be useful as a disinfectant for paper pulp (British Pat. No. 789,868). A more novel use for diphenyl mercury has been disclosed by Monsanto in British Pats. Nos. 852,921, 857,887 and 858,077, where diphenyl mercury in combination with aluminum bromide has been found to be useful as a Ziegler catalyst for the preparation of polyethylene from ethylene.

The following examples will further illustrate the process of the present invention.

EXAMPLE 1

Preparation of diphenyl mercury

In a three-necked round-bottom flask equipped with a mechanical stirrer, a reflux condenser, a drying tube and a gas inlet tube positioned to allow the gas to enter below the surface of the solvent, 5.6 grams (0.23 mole) of magnesium metal (purchased from Fisher Scientific Company) were added. The flask was heated with a bunsen burner while purging with dry nitrogen to remove any water from the system. After cooling, 8.3 grams (0.023 mole) of dry phenyl mercuric bromide (purchased from Alpha Inorganics, Inc.) and 100 mls. of dry tetrahydrofuran (distilled from lithium aluminum hydride immediately before use) were added. A fairly rapid stream of carbon dioxide ("bone dry" purchased from Matheson Company, Inc.) was bubbled continuously through the reaction system. After a short period of time all of the white solid went into solution and the reaction mixture became homogeneous. The mixture was then heated to reflux temperature for a period of three hours.

After completion of the reaction the mixture was poured into crushed ice. The excess magnesium reacted vigorously with the ice in a manner similar to that of magnesium amalgam. The unreacted magnesium was then dissolved with 50 mls. of concentrated hydrochloric acid. After all of the magnesium had gone into solution, the gray heterogeneous mixture was filtered through a sintered glass Buchner and the solid residue was dried in a stream of air. The organic material was separated from the residue by washing the solid with hot benzene. 2.3 grams (50%) of total mercury metal were recovered.

The filtrate was evaporated and 3.2 grams of a white solid were obtained. Fractional crystallization of the solid from benzene gave 0.1 gram of phenyl mercuric bromide and 3.1 grams (76%) of diphenyl mercury. The diphenyl mercury was identified by its melting point (121 to 123° C.) and its mixed melting point obtained by mixing the product with a known sample. The product was further identified by its infrared spectrum.

EXAMPLE 2

Preparation of dibutyl mercury

In a similar experiment to that of Example 1, 6.5 grams (0.0222 mole) of butyl mercuric chloride were reacted with 5.6 grams (0.23 mole) of magnesium turnings in 100 cc. of dry tetrahydrofuran. Dry carbon dioxide was bubbled through the system continuously. After four hours of reaction time the reaction mixture was poured into a mixture of hydrochloric acid and ice. The solution was filtered and a total of 2.15 grams of mercury metal (equivalent to 48.3%) were recovered. The filtrate was extracted three times with diethyl ether. Gas chromatographic analysis of the ether solution indicated 2.84 grams (40.6%) of dibutyl mercury to be present. In a similar experiment conducted in the absence of carbon dioxide, 4.2 grams, or a yield of 94%, of mercury metal were obtained.

We claim:
1. A process for preparing organomercury compounds having the formula

wherein R is a hydrocarbon group containing from 1 to 30 carbon atoms, comprising reacting at elevated temperatures in a solvent and in the presence of carbon dioxide, magnesium metal and a corresponding organomercury halide compound having the formula

wherein R is a hydrocarbon group containing from 1 to 30 carbon atoms and X may be chlorine, bromine or iodine.

2. The process of claim 1 wherein R of the organomercury compound and the corresponding organomercury halide compound is an aryl group containing from 6 to 30 carbon atoms.

3. The process of claim 1 wherein R of the organomercury compound and the corresponding organomercury halide compound is an alkyl group.

4. The process of claim 1 wherein the solvent is an aprotic solvent boiling in the range of from about 50 to 80° C.

5. The process of claim 4 wherein the solvent is tetrahydrofuran.

6. The process of claim 5 wherein the reaction is carried out within the temperature range of from about 35 to 100° C.

7. The process of claim 6 wherein the reaction is carried out within the temperature range of 55 to 75° C.

References Cited

UNITED STATES PATENTS

| | | | |
|---|---|---|---|
| 3,227,740 | 1/1966 | Fenton | 260—431 X |
| 3,016,397 | 1/1962 | Walde | 260—431 X |

OTHER REFERENCES

Jones et al., J. Amer. Chem. Soc., vol. 40, p. 1266 (1918).

JAMES E. POER, Primary Examiner

H. M. S. SNEED, Assistant Examiner

U.S. Cl. X.R.

260—433